United States Patent [19]
Henrick et al.

[11] 3,728,395
[45] Apr. 17, 1973

[54] INSECT CONTROL

[75] Inventors: Clive A. Henrick; John B. Siddall, both of Palo Alto, Calif.

[73] Assignee: Zoecon Corporation, Palo Alto, Calif.

[22] Filed: Mar. 29, 1971

[21] Appl. No.: 129,217

[52] U.S. Cl. ............260/594, 260/593 H, 260/593 R, 260/468 R, 260/410, 260/473 A, 260/476 R, 260/482 R, 260/486 R, 260/487, 260/488
[51] Int. Cl. ..........................C07c 49/20, C07c 49/24
[58] Field of Search ........................................260/594

[56] References Cited

OTHER PUBLICATIONS

Kologrivova et al., Chem. Abstracts 52, 19,929g (1958).

*Primary Examiner*—Daniel D. Horwitz
*Attorney*—Donald W. Erickson

[57] ABSTRACT

Long chain aliphatic carbonyl compounds having mono-unsaturation at position C-2,3 which are useful for the control of insects.

7 Claims, No Drawings

INSECT CONTROL

This invention relates to mono-unsaturated aliphatic carbonyl compounds of formula A, preparation thereof and the control of insects. The aliphatic carbonyl compounds useful for the control of insects according to the present invention are represented by the following formula A:

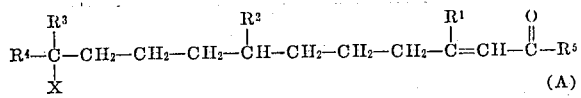

wherein, each of $R^1$, $R^2$, $R^3$, $R^4$ and $R^5$ is lower alkyl and X is hydrogen, bromo, chloro, fluoro or the group —OR in which R is hydrogen, lower alkyl or carboxylic acyl.

The term "lower alkyl," as used herein, refers to an alkyl group having a chain length of one to six carbon atoms.

The compounds of formula A are prepared according to the following outlined synthesis:

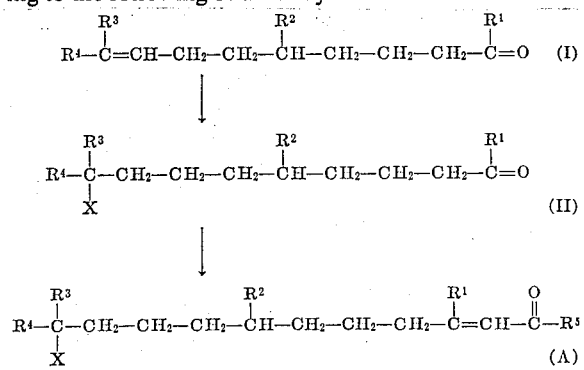

In the practice of the above synthesis, a ketone of formula I is converted into the saturated ketone or substituted ketone of formula II. The dihydro of I is formed by hydrogenation using palladium on carbon, or the like. The halides of formula II are prepared by treatment of the unsaturated compound I with dry hydrogen halide in an organic solvent such as a chlorinated hydrocarbon. The compounds of formula II wherein X is the group —OR in which R is hydrogen are prepared by the addition of water to the olefinic bond of a compound of formula I using a mercuric salt followed by reduction of the oxymercurial intermediate in situ. Suitable mercuric salts include mercuric acetate, mercuric nitrate, mercuric trifluoroacetate, mercuric acylates and mercuric halides. Suitable reducing agents include the borohydrides, hydrazine and sodium amalgam. See Brown and Rei, *J. Am. Chem. Soc.* 91, 5646 (1969); Brown et al., *J. Am. Chem. Soc.* 89, 1522 and 1524 (1967); and Wakabayashi, *J. Med. Chem.* 12, 191 (January, 1969). By conducting the reaction in the presence of an alcohol (R—OH) such as methanol, ethanol, isopropyl alcohol, benzyl alcohol, cyclopentanol, and the like, the corresponding ether is prepared. The compound of formula II wherein R is carboxylic acyl are prepared from a compound of formula II wherein R is hydrogen by reaction with a carboxylic acid chloride or bromide or carboxylic acid anhydride in pyridine or by treatment with a carboxylic acid anhydride in the presence of sodium acetate. The reaction is generally conducted at a room temperature to reflux temperature for about 1 to 48 hours, shorter reaction time being favored by temperatures above room temperature.

A compound of formula II is then reacted with a phosphonate anion of the formula

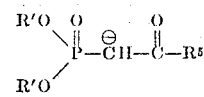

wherein R' is lower alkyl using Emmons-Wadsworth conditions to prepare a carbonyl of formula A.

The following examples are provided to illustrate the practice of the present invention. Temperature is given in degrees Centigrade.

EXAMPLE 1

A. A suspension of 0.5 g. of 5 percent palladium-on-carbon catalyst in 50 ml. of ethanol is hydrogenated for 30 minutes. A solution of 2 g. of 6,10-dimethyldodec-9-en-2-one in 100 ml. of ethanol is added and hydrogenated with agitation until the theoretical amount of hydrogen has been absorbed. The catalyst is then removed by filtration and the solution is evaporated to yield 6,10-dimethyldodecan-2-one.

In 9,10same way, each of 6,10-dimethylundecan-2-one, 6-ethyl-10-methyldodecan-2-one, 6-methyl-10-ethyldodecan-2-one and 6-methyl-10-ethyltridecan-2-one is prepared by hydrogenation of the respective 9,20-dehydio precursor.

B. To 1.0 g. of a 57 percent dispersion of sodium hydride in oil is added pentane. The pentane is removed and sodium hydride washed several times with pentane. To the washed sodium hydride is added 4.6 g. of diethylacetylmethylphosphonate in 20 ml. of tetrahydrofuran at −10° under argon. After several minutes, the solution is transferred to a solution of 2.0 g. of 6,10-dimethylundecan-2-one in about 15 ml. of dry tetrahydrofuran under argon over a period of about 20 minutes at room temperature. After about 24 hours, water is added followed by addition of ether and the layers separated. The organic layer is washed with saturated sodium chloride, dried over sodium sulfate, and evaporated under reduced pressure to yield 4,8,12-trimethyltetradec-3-en-2-one.

By use of the above process, each of 4,8,12-trimethyltridec-3-en-2-one, 4,12-dimethyl-8-ethyltetradec-3-en-2-one, 4,8-dimethyl-12-ethyltetradec-3-en-2-one, and 4,8-dimethyl-12-ethylperitadec-3-en-2-one is prepared from the respective precursor of part A above.

The process of part B is repeated with the exception of using diethyl propionylmethyl-phosphonate in place of diethyl acetyl-methylphosphonate to prepare the respective ethyl ketones, i.e., 5,9,13-trimethylpentadec-4-en-3-one,
5,9,13-trimethyltetradec-4-en-3-one,
5,13-dimethyl-9-ethylpentadec-4-en-3-one,
5,9-dimethyl-13-ethylpentadec-4-en-3-one, and
5,9-dimethyl-13-ethylhexadec-4-en-3-one, respectively.

EXAMPLE 2

A. To a solution of 1.7 g. of 6,10-dimethyldodec-9-en-2-one in 20 ml. of ethanol, cooled to 0° by an ice bath, is added a suspension of 2.3 g. of mercuric acetate in 50 ml. of ethanol over about 15 minutes. The reaction mixture is stirred for 2 hours and then, with cooling, 1.2 g. of potassium hydroxide in 20 ml. of ethanol is added. Then 0.139 g. of sodium borohydride is added in small portions and stirring continued for 30 minutes. The solution is decanted, then concentrated to half volume, diluted with 100 ml. of water and extracted with ether. The ethereal phase is washed with water, dried over magnesium sulfate and the crude product chromatographed on silica to yield 10-ethoxy-6,10-dimethyldodecan-2-one.

Using the above process, each of 10-ethoxy-6,10-dimethylundecan-2-one, 10-ethoxy-6-ethyl-10-methyldodecan-2-one, 10-ethoxy-6-methyl-10-ethyldodecan-2-one, and 10-ethoxy-6,10-ethyltridecan-2-one is prepared from 6,10-dimethylundec-9-en-e-one, 6-ethyl-10-methyldodec-9-en-2-one, 6-methyl-10-ethyldodec-9-en-2-one and 6-methyl-10-ethyltridec-9-en-2-one, respectively.

By using other lower monohydric alcohols (R—OH) in the foregoing process, such as methanol, the corresponding lower alkoxy derivatives are obtained, e.g.,
10-methoxy-6,10-dimethyldodecan-2-one,
10-methoxy-6,10-dimethylundecan-2-one, etc.

B. By use of the process of Example 1(B), diethyl acetylmethylphosphonate is reacted with the alkoxy substituted ketones of part A of this example to prepare the respective methyl ketones, e.g., 12-ethoxy-4-8,12-trimethyltetradec-3-en-2-one, 12-ethoxy-4,8,12-trimethyltridec-3-en-2-one, 12-ethoxy-4,12-dimethyl-8-ethyltetradec-3-en-2-one, 12-ethoxy-4,8-dimethyl-12-ethyltetradec-3-en-2-one, 12-ethoxy-4,8-dimethyl-12-ethylpentadec-3-en-2-one, 12-methoxy-4,8,12-trimethyltetradec-3-en-2-one, and 12-methoxy-4,8,12-trimethyltridec-3-en-2-one, respectively.

In the same way, following the process of part B of Example 1, diethyl propionylmethylphosphonate is reacted with the substituted ketones of part A of this example to prepare the respective ethyl ketones, i.e.,
13-ethoxy-5,9,13-trimethylpentadec-4-en-3-one,
13-ethoxy-5,9,13-trimethyltetradec-4-en-3-one,
13-ethoxy-5,13-dimethyl-9-ethylpentadec-4-en-3-one,
13-ethoxy-5,9-dimethyl-13-ethylpentadec-4-en-3-one,
13-ethoxy-5,9-dimethyl-13-ethylhexadec-4-en-3-one,
13-methoxy-5,9,13-trimethylpentadec-4-en-3-one, and
13-methoxy-5,9,13-trimethyltetradec-4-en-3-one.

EXAMPLE 3

A. To a mixture of 1.9 g. of mercuric acetate, 6 ml. of water and 20 ml. of tetrahydrofuran is added 1.2 g. of 6,10-dimethyldodec-9-en-2-one slowly. After addition is complete, the reaction mixture is stirred for about 20 minutes. The mixture is cooled to about 0° and 6 ml. of aqueous sodium hydroxide (3M) is added followed by 0.5 g. of sodium borohydride in aqueous sodium hydroxide (about 3M). The mixture is stirred for about 30 minutes. The mixture is then decanted, concentrated, diluted with water and then extracted with ether. The ethereal extract is washed with water, dried over magnesium sulfate and the product chromatographed to yield 10-hydroxy-6,10-dimethyldodecan-2-one.

Each of 10-hydroxy-6,10-dimethylundecan-2-one, 10-hydroxy-6-ethyl-10-methyldodecan-2-one, 10-hydroxy-6-methyl-10-ethyldodecan-2-one and 10-hydroxy-6-methyl-10-ethyltridecan-2-one is prepared from the respective 9,10-dehydro precursor using the above process.

Following the procedure of Example 1(B), each of the hydroxy-substituted ketones is reacted with diethyl acetylmethylphosphonate to yield the respective $\alpha,\beta$-unsaturated methyl ketone, i. e.,
12-hydroxy-4,8,12-trimethyltetradec-3-en-2-one,
12-hydroxy-4,8,12-trimethyltridec-3-en-2-one,
12-hydroxy-4,12-dimethyl-8-ethyltetradec-3-en-2-one,
12-hydroxy-4,8-dimethyl-8-ethyltetradec-3-en-2-one, and
12-hydroxy-4,8-dimethyl-12-ethylpentadec-3-en-2-one.

In the same way, the hydroxy-substituted $\alpha,\beta$-unsaturated ethyl ketones are prepared using diethyl propionylmethylphosphonate.

The compounds of formula A are useful for the control of insects. The compounds are applied using either liquid or solid carriers, such as water, acetone, cottonseed oil, xylene, mineral oil, silica, talc, natural and synthetic resins, and the like. Generally, compositions for application will contain up to about 75 percent of the active compound and more usually less than 25 percent, sufficient composition should be applied to provide from about 0.01 or less to 25 micrograms of the active compounds per insect. Typical insects controlled by the present invention are Diptera, such as mosquitos and houseflies; Hemiptera, such as Pyrrhocoridae and Miridae; Homoptera, such as Aphids, Lepidoptera; and Coleoptera, such as Tenebrionidae, Crysomelidae and Dermestidae. For example, Pyrrhocoris *apterus*, Lygus *hesperus*, Tenebrio *molitor*, Triboleum *confusm*, Diabrotica *duodecimpunctata*, Dermestes *maculatus*, Aedes *aegypti*, Musca *domestica* and roaches. Without any intention of being bound by theory, the compounds of formula A are not believed to be effective by reason of causing immediate death, but rather the compounds of formula A are effective by reason of physiological changes caused in the treated insect which result in eventual death of the insect and/or inability of the treated insect to reproduce by reason of sterility or abnormal development.

EXAMPLE 4

The process of Example 1(B) is repeated with the exception that after addition of 6,10-dimethylundecan-2-one is complete, the reaction mixture is refluxed overnight and then worked up to yield 4,8,12-trimethyltetradec-3-en-2-one.

What is claimed is:

1. A compound selected from those of the following formula A:

$$R^4-\underset{\underset{X}{|}}{\overset{\overset{R^3}{|}}{C}}-CH_2-CH_2-CH_2-\overset{\overset{R^2}{|}}{C}H-CH_2-CH_2-CH_2-\overset{\overset{R^1}{|}}{C}=CH-\overset{\overset{O}{\|}}{C}-R^5$$

(A)

wherein, each of $R^1$, $R^2$, $R^3$, $R^4$ and $R^5$ is lower alkyl and X is the group — OR in which R is hydrogen, or lower alkyl.

2. A compound according to claim 1 wherein each of $R^1$, $R^2$, $R^3$ and $R^4$ is methyl or ethyl.

3. A compound according to claim 1 wherein R is hydrogen and $R^5$ is methyl or ethyl.

4. A compound according to claim 1 wherein R is lower alkyl and $R^5$ is methyl or ethyl.

5. A compound according to claim 4 wherein R is lower alkyl of one to three carbon atoms.

6. A compound according to claim 5 wherein $R^1$ is methyl.

7. A compound according to claim 1 which is 12-ethoxy-4,8,12-trimethyltridec-3-en-2-one.

* * * * *